Jan. 2, 1934.  C. E. SWENSON  1,941,764
UNIVERSAL JOINT
Filed July 25, 1932

Inventor:
Carl E. Swenson
By Wilson, Bowell, McCanna & Rehm
Attys.

Patented Jan. 2, 1934

1,941,764

UNITED STATES PATENT OFFICE 1,941,764

UNIVERSAL JOINT

Carl E. Swenson, Rockford, Ill., assignor to Mechanics Universal Joint Company, Rockford, Ill., a corporation of Illinois Application July 25, 1932. Serial No. 624,599

15 Claims. (Cl. 64—102)

This invention relates to trunnion type universal joints adapted for use on motor vehicles.

One important object of my invention is to provide a universal joint of the type mentioned having roller bearings for the trunnions, each of a unitary construction whereby to facilitate assembly and make for handiness as well as economy in replacement or repair. Thus, the rollers are made with reduced cylindrical ends to fit in annular grooves in the inner ends of the bearings, whereby to dispense with any separate retainer means at that point, and the bearings have sheet metal rings provided on the outer ends thereof on which an inturned annular lip is formed for engagement with the outer ends of the rollers to retain the same in proper position.

Another important object consists in the provision of bearings in the form of caps for the various trunnions, having end walls to serve as end thrust bearings for the ends of the trunnions in addition to side walls to provide the radial bearings, the caps also having annular outwardly projecting flanges by means of which the same are arranged to be bolted onto the yoke members. As a matter of economy in production, the caps are machined from bar stock, and in order to permit the use of bar stock of the smallest possible size, I make up the outer portion of the flange by separate stamped sheet metal rings, the bolt holes in the flanges being provided by registering notches in the flange proper and in the ring, so that the bolt heads overlap both sides of the joint. As a further means of economizing in the construction of the caps, I provide a sheet metal ring pressed onto the lower end of the cap and projecting therefrom sufficiently to provide support for the roller retainer ring, previously mentioned. In that way, the length of the piece cut from bar stock can be made proportionately shorter to effect a saving in cost.

Another important object consists in the provision of a packing ring of compressible resilient material fitting in the roller container ring and in engagement with the inner end of the trunnion to seal the bearing against loss of lubricant and entry of dirt, the lower edge of the retainer ring being specially formed to provide a series of spaced openings into or through which the material of the packing ring is arranged to bulge so as to lock the packing ring against turning relative to the retainer ring and insure wiping contact with the trunnion for an effective seal.

The invention is illustrated in the accompanying drawing, in which—

Figure 1:
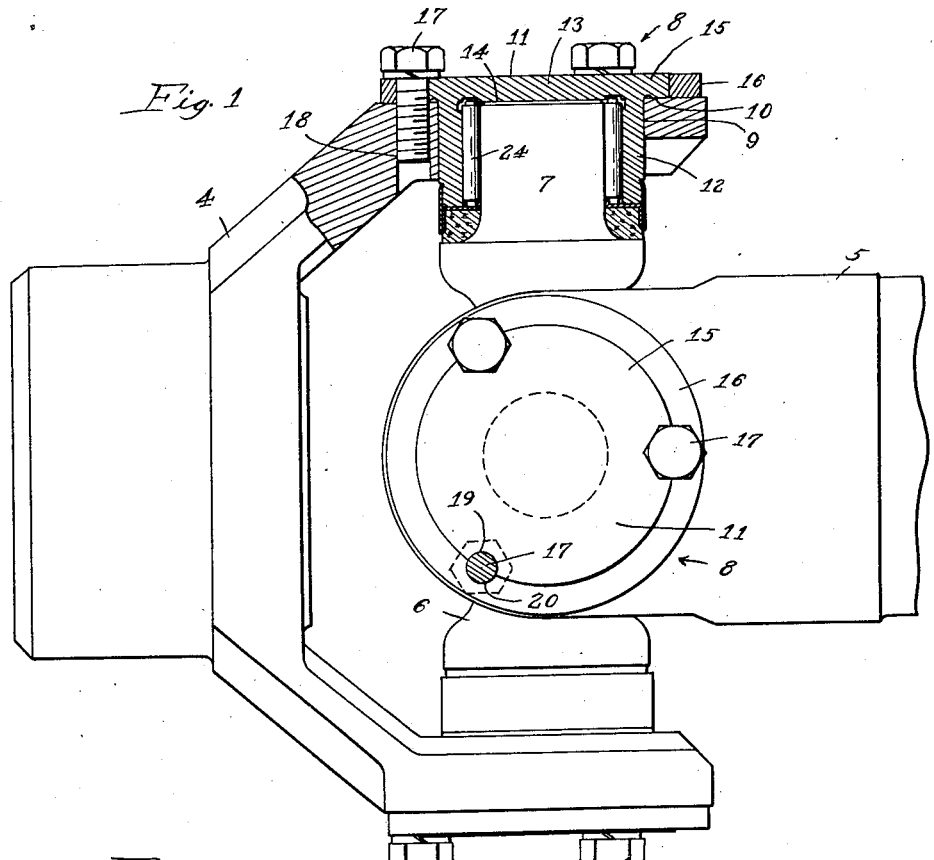
Figure 2:
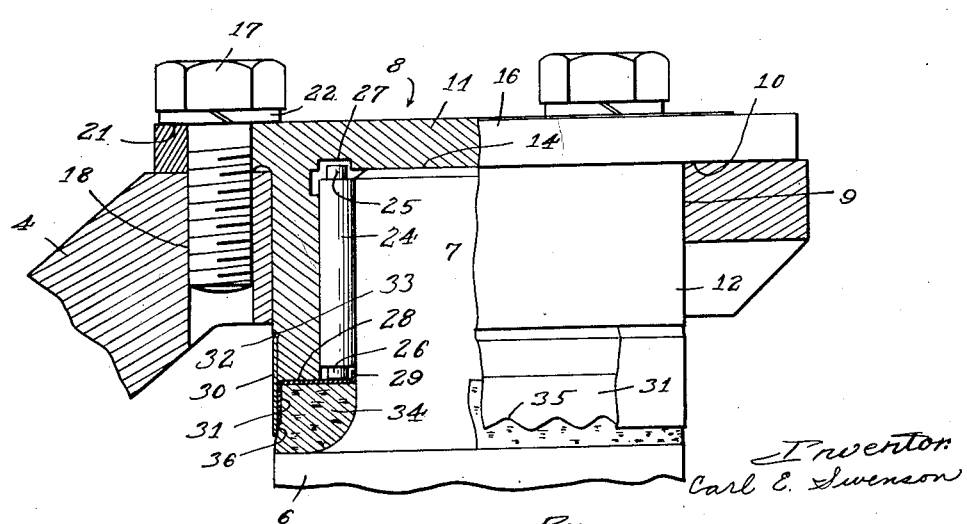

Figure 1 is a side view of a universal joint made in accordance with my invention and showing one of the bearings in central longitudinal section, and Fig. 2 is an enlargement of the portion appearing in section in Figure 1.

The present invention, as indicated above, is primarily concerned with the construction and mounting of the bearings which provide radial and end thrust bearing support for the trunnions. It is unnecessary, therefore, to describe in detail the rest of the joint other than to state that it is of the trunnion type and comprises a pair of yokes or terminal coupling members 4 and 5 connected by means of an intermediate transmission member 6, sometimes referred to as the spider, the same providing four trunnions 7, 90° apart. The trunnions are received in bearings, indicated generally by the numeral 8, each yoke being equipped with one pair of these bearings. The yokes are, of course, suitably connected to driving and driven members. The spider 6 is usually made hollow so as to provide a central lubricant reservoir which is filled by removal of a plug, not shown, and from which the lubricant is conducted to the bearings 8 through radial holes provided in the trunnions 7, communicating with the reservoir. Any fluid or semi-fluid lubricant may be used. I have found what is commonly called cup grease best for the present purposes.

The yokes 4 and 5 are preferably machine finished on all surfaces so as to have a true dynamic balance. Radial holes 9 are provided in exact alignment with each other in the two arms of each yoke, and flat seats 10 are machined on the outer side of the arms exactly at right angles to the axis of the holes. The bearings 8 are in the form of caps 11 so as to fit over the trunnions 7, the hollow cylindrical portion 12 of each cap being adapted to provide radial bearing support for the trunnion disposed therein, and the end wall 13 being adapted to provide end thrust bearing support by engagement of the end of the trunnion with the smooth inside surface 14 of said wall. Now, the caps 11 are produced on a screw machine for quantity production at low cost and will be made from bar stock of the same outside diameter as the annular outwardly projecting flange 15 provided on the end of the caps. The hollow cylindrical portion 12 of each cap will be machined externally to have a snug fit in the holes 9, and the inner side of the flange 15 will be machined to fit on the seats 10. From the standpoint of economy, it is, of course, desirable to use bar stock of the smallest possible diameter in the production of the bearing caps, and with that end in view, I make the flange proper only large enough to accurately locate the bearing caps by abutment with the seats 10, and make up the outer portion of each flange by a separate ring 16 stamped from sheet metal. In that way, I am enabled to fasten the bearings to the yoke members by means of bolts 17 just as firmly as if the same had wide flanges. Threaded bolt holes 18 are provided in the yokes for reception of the bolts 17, and registering holes are provided in the flanges by registering notches in the flange proper and in the ring, as indicated at 19 and 20, respectively, in Figure 1. In that way, the heads of the bolts 17 overlap both sides of the joint between the flange proper and its encircling ring. In order positively to insure the seating of the flange proper, the ring is stamped from sheet metal a few thousandths of an inch thinner than the flange, as indicated by the clearance appearing at 21 in Fig. 2. If that were not done, it is obvious that there might be danger of the caps 11 being loose on the yokes, although the bolts 17 were tightened enough to firmly clamp the rings 16. The only purpose of the rings 16 is to give added width to the flanges 15 so as to provide lateral support for the shanks of the bolts 17 and additional seating surfaces for the heads of said bolts. In actual practice, the lock washers 22 will seat solidly on the flange 15 and ring 16 when the bolts 17 are tightened, and there will be no clearanace perceptible and the ring will appear to be just as tightly clamped as the rest of the bearing and it will not be at all evident that it is a separate part.

The bearings 8, instead of being plain journal bearings, have anti-friction rollers 24 provided therein to make for easier and smoother operation, and consequently more efficient power transmission and longer life. Under high pressures, such as are dealt with in universal joints in heavy duty service, as on trucks, busses, etc., if a poor lubricant is used, or there is insufficient lubricant, the bearing surfaces in ordinary universal joints having plain journal bearings will break down under the heat of friction that is developed, such joints being apt to heat up to the point of smoking and actually binding. Now, a universal joint having roller type bearings avoids the aforesaid objection, because a roller joint does not heat up under the conditions mentioned but stays cool, which is a factor in preserving the lubricant and avoiding the destruction of the bearing surfaces. The present universal joint is, in other words, intended for heavy duty service, although the same construction could be utilized in smaller joints on higher priced cars whose specifications demand universal joints better than the average. The anti-friction roller bearings can be incorporated without seriously complicating the design and construction, as herein shown. The rollers 24 have reduced cylindrical ends 25 and 26. The inner ends 25 fit in an annular channel-shaped groove 27 formed in the end wall 13 of the bearing, thus avoiding the necessity for any separate retainer means for the rollers at that end. The groove 27 is made wider than the diameter of the ends 25 of the rollers because it is intended only to serve as a retaining recess for the inner ends of the rollers to keep the rollers from dropping out when the bearing is slipped off the trunnion. In other words, it is not intended to have the ends 25 find bearing support in the groove 27. A sheet metal retainer ring 28 mounted on the bearing in a manner hereinafter described has an annular inturned lip 29 which cooperates with the reduced cylindrical ends 26 of the rollers 24 to hold the rollers in place in the bearing. The thought is to have each bearing with its complement of rollers in the form of a unitary assembly, so as to facilitate assembling of the bearing in a universal joint, and make it an easier matter to remove and replace bearings in the case of inspection, repair, or replacement.

As a matter of further economizing in the construction of the bearings, I provide stamped sheet metal rings 30 on the slightly reduced lower ends of the cylindrical portions 12 of the caps 11, projecting therefrom sufficiently to serve as a support for the roller retainer ring 28. The latter is of angular cross-section and its annular flange 31 has a press fit in the ring 30. The ring 30, in turn, has a press fit on the lower end of the bearing cap and has its upper margin 32 bent inwardly into an annular recess 33 provided therefor on the cap, so as to make for a permanent assembly. It is clear, therefore, that since the ring 30 accomplishes the same purpose as a counterbore in the lower end of the bearing cap, the cap can be made that much shorter than otherwise and a saving in bar stock is realized and the cost of the finished bearing cap is appreciably lower. The outside diameter of the finished bearing cap at the ring 30 is the same as or smaller than the outside diameter of the rest of the portion 12, so as to permit entry of the bearing cap in the hole 9.

The roller retainer ring 28, being of angular cross-section, as stated before, affords an annular recess therein for reception of a packing ring 34 of any suitable compressible, resilient, packing material, such as cork. The ring 34 is formed to fit the lower or root portion of the trunnion 7 and is provided of a size slightly larger than the inside diameter of the flange 31 so that a certain amount of compression is necessary to get the packing ring assembled in the retainer ring. This, in itself, tends to hold the packing ring against turning in the retainer ring, so as to have wiping contact with the trunnion. However, in order to more positively prevent the packing ring from turning in the retainer ring, I make the edge of the flange 31 scalloped, as indicated at 35 in Fig. 2, or form it in any other suitable way to provide a series of spaced openings or recesses into or through which portions of the packing ring may bulge, as indicated at 36, whereby to interlock the packing ring with the retainer ring and prevent relative movement therebetween. A packing ring held in place in this way will last longer and more effectively seal the bearing against loss of lubricant and entry of dirt or water. The ring 30 may, if desired, extend far enough from the bearing to enclose the ring 28 and most, if not all, of the packing ring 34, as shown.

A universal joint made in accordance with my invention, as just described, is available at very little additional cost as compared with a universal joint of the same size but equipped with plain journal bearings.

I claim:

1. In a universal joint of the trunnion type, a trunnion bearing comprising a cap fitting in an opening in one of the members of the joint to furnish radial bearing support for the trunnion by its side walls and end thrust bearing support for the trunnion by its end wall, said cap being turned from bar stock of a predetermined diameter, whereby to provide an annular outwardly projecting flange of said diameter to seat on the joint member, a ring encircling the flange to form an extension thereof, and bolts entered in openings provided in the flange with the heads overlying both the ring and flange to fasten the parts in place on the joint member, whereby the bolts serve the principal function of clamping the bearing cap by its flange, and the ring offers lateral support for the bolts when tightened and prevents deflection thereof from normal position.

2. A structure as set forth in claim 1 wherein the ring is formed of sheet metal of a certain thickness slightly less than the thickness of the flange on the cap, whereby the top surface of the flange is disposed in relief with respect to the top surface of the ring when seated on the joint member, so as to insure tighter fastening of the cap by engagement of the heads of the bolts with the top surface of the flange.

3. In a universal joint of the trunnion type, a trunnion bearing comprising a cap fitting in an opening in one of the members of the joint to furnish radial bearing support for the trunnion by its side walls and end thrust bearing support for the trunnion by its end wall, said cap being turned from bar stock of a predetermined diameter, whereby to provide a narrow outwardly projecting annular flange of said diameter to seat on the joint member, a ring encircling the flange and also adapted to seat on the joint member and constitute an extension portion of the flange, and bolts entered through holes in said ring with the heads of the bolts overlapping the flange whereby to fasten the bearing in place, the head of each bolt serving thereby to clamp the flange on the seat while the ring provides lateral support for the bolts to prevent deflection thereof from normal position.

4. A structure as set forth in claim 3 wherein the ring is formed of sheet metal of a certain thickness slightly less than the thickness of the flange on the cap, whereby the top surface of the flange is disposed in relief with respect to the top surface of the ring when seated on the joint member, so as to insure tighter fastening of the cap by engagement of the heads of the bolts with the top surface of the flange.

5. In a universal joint having trunnions, bearings for said trunnions adapted to be lubricated, each bearing comprising a cap member of hollow cylindrical form provided with one end wall and adapted to be entered with a close fit through an opening provided in one of the members of the joint, the side walls of said cap member serving to furnish radial bearing support and the end wall serving to furnish end thrust bearing support for the trunnion received in the cap member, the cap member being suitably secured to the joint member, means encircling the lower end of the trunnion and serving to close the lower end of the cap member to retain lubricant therein and exclude dirt and water therefrom, and a ring mounted on the outside of the cap member at its lower end on a reduced portion thereof and serving to enclose the last mentioned means, said ring being small enough in outside diameter to be entered freely with the cap member through the opening in the joint member.

6. In a universal joint having trunnions, bearings for said trunnions, each bearing comprising a cap member of hollow cylindrical form provided with one end wall and adapted to be entered with a close fit through an opening provided in one of the members of the joint, the side walls of said cap member serving to furnish radial bearing support and the end wall serving to furnish end thrust bearing support for the trunnion received in the cap member, the cap member being suitably secured to the joint member, rollers disposed inside the cap member between the side walls thereof and the trunnion for anti-friction radial bearing support of the trunnion, means on the lower end of the cap member to retain the rollers, and a ring mounted on the outside of the cap member at its lower end on a reduced portion thereof and serving to enclose and support the last mentioned means, said ring being small enough in outside diameter to be entered freely with the cap member through the opening in the joint member.

7. In a universal joint having trunnions, bearings for said trunnions, each bearing comprising a cap member of hollow cylindrical form provided with one end wall and adapted to be entered with a close fit through an opening provided in one of the members of the joint, the side walls of said cap member serving to furnish radial bearing support and the end wall serving to furnish end thrust bearing support for the trunnion received in the cap member, the cap member being suitably secured to the joint member, rollers disposed inside the cap member between the side walls thereof and the trunnion for anti-friction radial bearing support of the trunnion, a stamped sheet metal ring of angular cross-section disposed at the lower end of the cap member, the same having an inturned annular flange serving to retain the rollers in the cap member, and a downturned annular flange on the outer periphery thereof, the last mentioned flange being adapted to serve as an enclosure for packing means to seal the lower end of the cap member against loss of lubricant and entry of dirt and water, and a sheet metal ring mounted on a reduced external portion of the cap member at the lower end thereof and projecting downwardly from said member to enclose and retain the aforesaid ring, the second ring being small enough in outside diameter to be entered freely with the cap member through the opening in the joint member.

8. A structure as set forth in claim 7 wherein the lower edge of the downturned flange of the first mentioned ring is scalloped whereby to provide a series of spaced openings into or through which packing material compressed within the confines of said flange is adapted to bulge whereby to prevent turning of the packing material relative to said ring.

9. A structure as set forth in claim 7 wherein the downturned annular flange on the first mentioned ring has one or more openings provided therein, whereby to cause the projection therein of portions of compressible resilient packing material compressed within the confines of said flange, and thereby prevent turning of said material relative to the ring.

10. A structure as set forth in claim 7 wherein the downturned annular flange on the first mentioned ring has one or more openings provided therein, whereby to cause the projection therein of portions of compressible resilient packing material compressed within the confines of said flange, and thereby prevent turning of said material relative to the ring, and wherein the second ring serves to cover the outside of the openings to conceal and protect the packing material.

11. A structure as set forth in claim 14 wherein the retainer ring is of stamped sheet metal arranged to have a press fit in a recess provided therefor on the lower end of the bearing member, and wherein said ring has a peripheral flange the edge of which is scalloped to provide the openings for reception of the bulged portions of the packing material compressed in the ring.

12. A structure as set forth in claim 1 wherein the openings for the bolts are provided partly in the ring and partly in the flange, whereby to substantially evenly divide the overlap of the bolt heads between the flange and ring.

13. In a universal joint having trunnions, bearings for said trunnions adapted to be lubricated, each bearing comprising a cap member of hollow cylindrical form provided with one end wall and adapted to be entered with a close fit through an opening provided in one of the members of the joint, the side walls of said cap member serving to furnish radial bearing support and the end wall serving to furnish end thrust bearing support for the trunnion received in the cap member, the cap member being suitably secured to the joint member, rollers disposed inside the cap member between the side walls thereof and the trunnion for antifriction radial bearing support of the trunnion, means on the lower end of the cap member to retain the rollers and another means serving to close the lower end of the cap member to retain lubricant therein, and a ring mounted on the outside of the cap member at its lower end on a reduced portion thereof and serving to enclose and support the last two mentioned means, said ring being small enough in outside diameter to be entered freely with the cap member through the opening in the joint member.

14. In a universal joint having trunnions and bearings adapted to be lubricated, means for sealing each bearing against loss of lubricant comprising a packing washer of compressible resilient material encircling the trunnion, and a retainer ring for the washer mounted on the bearing, said retainer ring having a side wall within which the packing washer is adapted to be compressed, said wall having one or more openings into or through which the packing washer is adapted to bulge, whereby to interlock with the ring and prevent turning relative thereto.

15. A structure as set forth in claim 14 including an outer retaining wall on the bearing surrounding the aforesaid side wall so as to cover the outside of the openings for concealment and protection of the packing washer.

CARL E. SWENSON.